(12) United States Patent
Vatavu et al.

(10) Patent No.: US 11,282,158 B2
(45) Date of Patent: Mar. 22, 2022

(54) METHOD FOR MANAGING TRACKLETS IN A PARTICLE FILTER ESTIMATION FRAMEWORK

(71) Applicant: Robert Bosch GmbH, Stuttgart (DE)

(72) Inventors: Andrei Vatavu, Santa Clara, CA (US); Oliver Schwindt, Plymouth, MI (US); Dominik Nuss, Santa Clara, CA (US); Gunther Krehl, San Francisco, CA (US); Michael Maile, Half Moon Bay, CA (US); Suresh Govindachar, Milpitas, CA (US)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 17/029,541

(22) Filed: Sep. 23, 2020

(65) Prior Publication Data
US 2021/0097638 A1    Apr. 1, 2021

(30) Foreign Application Priority Data
Sep. 26, 2019  (EP) .................................... 19199905

(51) Int. Cl.
*G06T 1/00*    (2006.01)
*G05B 19/4155*    (2006.01)
(Continued)

(52) U.S. Cl.
CPC ........ *G06T 1/0014* (2013.01); *G05B 19/4155* (2013.01); *G06K 9/2054* (2013.01);
(Continued)

(58) Field of Classification Search
CPC .............. G06T 1/0014; G05B 19/4155; G05B 2219/31005; G05B 2219/39046;
(Continued)

(56) References Cited

U.S. PATENT DOCUMENTS

| 8,149,278 | B2 * | 4/2012 | Wren | ................. G06K 9/00771 348/143 |
| 8,391,548 | B1 * | 3/2013 | Medioni | ............ G06K 9/00771 382/103 |

(Continued)

FOREIGN PATENT DOCUMENTS

| EP | 1533628 A1 * | 5/2005 | ........... G01S 13/726 |
| EP | 1927947 A1 * | 6/2008 | ....... G08B 13/19608 |

(Continued)

*Primary Examiner* — Manav Seth
(74) *Attorney, Agent, or Firm* — Maginot, Moore & Beck, LLP

(57) ABSTRACT

A method for managing tracklets in a particle filter estimation framework includes executing a tracklet prediction dependent on a list of previous tracklets, thereby determining persistent tracklets and new tracklets; sampling new measurements for initializing the new tracklets, thereby determining an amount of estimated new tracklets; and determining an amount of the persistent tracklets dependent on the list of previous tracklets. The method further includes determining an amount of the new tracklets and an amount of updated persistent tracklets to be sampled dependent on the amount of estimated new tracklets, the amount of the persistent tracklets, and a memory bound; sampling the updated persistent tracklets from a list of the persistent tracklets dependent on the determined amount of the updated persistent tracklets; and sampling the new tracklets from unassociated measurements dependent on the determined amount of the new tracklets.

11 Claims, 3 Drawing Sheets

(51) Int. Cl.
  *G06K 9/20* (2006.01)
  *G06K 9/62* (2022.01)
(52) U.S. Cl.
  CPC .. *G06K 9/6268* (2013.01); *G05B 2219/31005* (2013.01); *G05B 2219/39046* (2013.01); *G06K 9/6289* (2013.01); *G06K 2209/19* (2013.01)
(58) Field of Classification Search
  CPC .. G06K 9/2054; G06K 9/6268; G06K 9/6289; G06K 2209/19
  See application file for complete search history.

(56) References Cited

U.S. PATENT DOCUMENTS

| | | | | |
|---|---|---|---|---|
| 8,538,083 | B1* | 9/2013 | Medioni | G06K 9/00771 |
| | | | | 382/103 |
| 8,958,600 | B2* | 2/2015 | Othmezouri | G06T 7/251 |
| | | | | 382/103 |
| 9,342,759 | B1* | 5/2016 | Chen | G06K 9/6262 |
| 9,361,520 | B2* | 6/2016 | Collins | G06K 9/00724 |
| 9,563,843 | B2* | 2/2017 | Yufik | G06N 3/063 |
| 9,582,718 | B1* | 2/2017 | Carr | G06T 7/277 |
| 10,157,479 | B2* | 12/2018 | Estrada | G06N 3/08 |
| 10,408,939 | B1* | 9/2019 | Kim | G06T 7/521 |
| 10,430,953 | B2* | 10/2019 | Roshtkhari Javan ... | G06T 7/246 |
| 10,628,961 | B2* | 4/2020 | Sundaresan | G06T 7/74 |
| 10,803,598 | B2* | 10/2020 | Chaurasia | G06T 7/20 |
| 10,867,394 | B2* | 12/2020 | Akiyama | G06K 9/00778 |
| 10,997,737 | B2* | 5/2021 | Geva | G06T 7/73 |
| 11,030,755 | B2* | 6/2021 | Latapie | G06N 20/00 |
| 11,049,170 | B1* | 6/2021 | Francis | G06F 7/14 |
| 11,127,203 | B2* | 9/2021 | Gao | G01C 21/32 |
| 11,145,076 | B1* | 10/2021 | Horesh | G06T 7/74 |
| 2008/0123900 | A1* | 5/2008 | Ma | G06T 7/277 |
| | | | | 382/103 |
| 2008/0130949 | A1* | 6/2008 | Ivanov | G06K 9/00771 |
| | | | | 382/103 |
| 2011/0085702 | A1* | 4/2011 | Nevatia | G06K 9/03 |
| | | | | 382/103 |
| 2016/0335502 | A1* | 11/2016 | Roshtkhari | G06K 9/00771 |
| 2017/0309031 | A1* | 10/2017 | Wu | G06K 9/00744 |
| 2018/0047173 | A1* | 2/2018 | Wang | G06T 7/62 |
| 2018/0114072 | A1* | 4/2018 | Wang | G06K 9/6297 |
| 2018/0197296 | A1* | 7/2018 | Liu | G06T 7/20 |
| 2018/0314894 | A1* | 11/2018 | Wang | G06K 9/00718 |
| 2019/0147335 | A1* | 5/2019 | Wang | G06N 3/0454 |
| | | | | 706/20 |
| 2019/0156496 | A1* | 5/2019 | Leduc | G06K 9/3241 |
| 2019/0382007 | A1* | 12/2019 | Casas | G06K 9/00335 |
| 2020/0193662 | A1* | 6/2020 | Juangbhanich | G06T 7/254 |
| 2021/0142044 | A1* | 5/2021 | Wang | G06K 9/00288 |
| 2021/0192737 | A1* | 6/2021 | Zhou | G06T 7/223 |
| 2021/0316463 | A1* | 10/2021 | Ku | G06T 7/75 |

FOREIGN PATENT DOCUMENTS

| | | | | |
|---|---|---|---|---|
| WO | WO-2012024516 A2 * | 2/2012 | | G01S 3/7864 |
| WO | WO-2013072401 A2 * | 5/2013 | | G06Q 10/00 |
| WO | WO-2013158502 A1 * | 10/2013 | | G01C 23/00 |

* cited by examiner

METHOD FOR MANAGING TRACKLETS IN A PARTICLE FILTER ESTIMATION FRAMEWORK

This application claims priority under 35 U.S.C. § 119 to patent application no. EP 19199905.1, filed on Sep. 26, 2019 in Europe, the disclosure of which is incorporated herein by reference in its entirety.

The present disclosure relates to a method and a control unit for managing tracklets in a particle filter estimation framework, as well as a control method.

BACKGROUND

One of the indispensable functions of an at least partly autonomous driving vehicle is to estimate its dynamic world, which includes various traffic participants within complex driving scenarios. To achieve that in a particle filter estimation framework, dynamic grid maps are one of the possible ways to combine and estimate the multi-sensory information at an intermediate level. Therefore, individual particle filter based estimators, so called tracklets, are used for stabilizing a position estimation accuracy of dynamic cells in the dynamic grid maps and used for estimating a shape of an object.

Theoretically, the number of tracklets can grow above an available memory limit. While tracklets should be replicated and removed in accordance with a validation metric like existence probability, the maximum number of tracklets should be fixed within the memory limit.

Thus, there is a need for an improved method for managing tracklets in a particle filter estimation framework.

SUMMARY

According to an aspect, a method for managing tracklets in a particle filter estimation framework comprises the following steps: Executing a tracklet prediction dependent on a list of previous tracklets, thereby determining persistent tracklets and new tracklets. Sampling new measurements for initializing the new tracklets, thereby determining an amount of estimated new tracklets. Determining an amount of persistent tracklets dependent on the list of previous tracklets. Determining an amount of new tracklets and an amount of updated persistent tracklets to be sampled dependent on the amount of estimated new tracklets, the amount of persistent tracklets and a memory bound. Sampling updated persistent tracklets from the list of persistent tracklets dependent on the determined amount of updated persistent tracklets and sampling the new tracklets from unassociated measurements dependent on the determined amount of new tracklets.

Preferably, the particle filter estimation framework is configured for executing a particle filter based dynamic grid map estimation. Further preferably, the dynamic grid map estimation comprises a multi-channel measurement processing. The multi-channel measurement processing is a multi-layer particle filter based tracking solution—MLPT.

The term "grid map", as used herein, describes a map, wherein a surrounding space is tessellated into rectangular grid cells. Preferably, each grid cell is an independent building block of the space that stores properties like occupancy probability. The occupancy probability thereby indicates a value of occupancy of the grid cell.

Preferably, every tracklet is described by a double motion, static and dynamic.

For particle filter based dynamic grid map estimation comprises the following steps. In a first step, raw sensor data, which are also called raw measurements, of a target object is determined by a plurality of sensor interfaces, preprocessed, and transformed into compact, in particular medium-level, data structures. Additionally, compact sensor data, or compact measurements, is determined dependent on the determined raw sensor data. Therefore, each sensor is described by its own measurement model. For example, lidar point clouds and stereo vision images are both transformed into a more compact Stixel-based representation. The Stixels model a surrounding environment as vertically oriented rectangles that are able to incorporate properties like position, depth, size and semantic information of the target object, in particular individual object parts of the target object. In a different example, radar locations of the target object are compressed to a set of prefiltered target points, which include a Cartesian position and a velocity of the target object.

In a second step, the compact sensor data is integrated into separate evidence grid channels. Preferably, an evidence grid channel is defined as an independent 2D grid representation that accumulates a group of sensor data, in other words sensor observations, from one or multiple sensors. For example, two grid channels are determined, an occupancy grid channel and a semantic grid channel. Further preferably, additional grid channels use gradients or height properties of the target object.

For example, the measurement occupancy grid channel is determined by accumulating range measurements from all available sensors during a given fixed time interval. New measurements are then integrated into the occupancy grid by using a Dempster-Shafer theory of evidence. Thus, each grid cell is described by a belief mass of occupied, free or unknown, and can be converted into a conventional occupancy probability by using a pignistic transformation.

For example, the measurement semantic grid channel combines semantic information provided by both the Stixel transformation and the compressed radar locations. Thus, projected object labels are determined by the measurement semantic grid channel. Every projected object label identifies a given object class, for example pedestrian, bicycle or vehicle, and has an associated confidence score. Due to memory constraints, after integrating the object labels into the semantic channel, only the top object labels are kept per cell, based on their highest accumulated scores, instead of storing a full histogram of all the accumulated object labels per cell.

Preferably, both measurement grid channels are described by the same size and resolution. Also, both channels are aligned in time. The same time interval is used to integrate input measurements and space, wherein a given area in world coordinates is projected into the same cell indices in both grids.

In a third step, a hybrid particle filter-based estimation is executed dependent on the evidence grid channels. The hybrid filter-based estimation comprises self-localizing tracklets and multi-channel grid estimation. In the particle filter-based estimation, at each specific time, a probability distribution is approximated by a set of individual particles, wherein each particle represents an object hypothesis of a grid cell state and has an assigned weight according to how well the particle matches the measurements.

In existing grid-based particle filters a grid cell state is approximated by a set of samples. Particles are not associated permanently to one grid cell state, but are propagated according to their own motion model and, subsequently, are reassigned to new destination grid cells. Then, for all particles a weight is determined proportional to an occupancy belief of the new destination grid cell. When the destination grid cells are sensed to be occupied, higher weights are assigned to those particles. In general, a particle predicted in the middle of a larger target object can be assigned to any of the occupied cells and still be rewarded with a high weight. In other words, the particles receive their weights without being aware of their own position with respect to the object hypothesis.

Preferably, determining the weight is also dependent on additional knowledge about a target object shape. An assumption is made that a given dynamic grid cell is part of a larger target object hypothesis. Therefore, apart from its position and velocity, a dynamic grid cell is also described by its relative position to object landmarks. The object landmarks are initialized by selecting a random set of points from a same target object shape. In order to take into account a change in a geometry of the target object, relative distances from grid cells to their selected landmarks has to also be recursively updated, at each measurement iteration.

For every newly measured grid cell a fixed set of particles is determined. This group of particles will represent an individual particle filter-based estimator, a tracklet. Therefore, instead of maintaining and updating one larger set of particles for the whole grid map, multiple, smaller, independent populations of particles are organized into the tracklets. In the end, different tracklets that are part of the same target object hypothesis will be described by different combinations of random landmarks selected from the same target object contour, wherein the target object contour indicates a contour of the target object. However, all the particles included into one tracklet will be initialized with the same fixed constellation of landmarks, preselected to describe a tracklet state.

The multi-channel grid estimation comprises integrating the measurements structured into grid channels. For each grid cell position at each point in time, an appearance vector is described, which combines the raw measurements of the occupancy and semantic channels. The appearance vector is thus completely described by a mass for occupied, a mass for free, and a semantic label.

Once new measurements, are received, the following steps recursively estimate the dynamic state for each tracklet as well as each grid cell:

Particles are predicted at a new position in the grid cell, by taking into account the elapsed time, and their estimated state at the previous particle filter cycle. A constant velocity motion model is assumed, where a modelling error is accounted for by perturbing each propagated sample with a random noise component.

Preferably, landmark prediction is done implicitly by the particle prediction, as the landmarks are conditioned on the particle state and follow the motion of the particle.

In another step, every predicted sample is being assigned a new importance weight. This step incorporates the information from the measurement into the particle distribution by giving weights to particles, which are proportional to the likelihood of matching the observation. For a measurement at a specific time, and the predicted state from above, the measurement model consists of three components: a measurement cell likelihood, a landmark based likelihood, and a semantic likelihood.

The measurement cell likelihood is based on a position error, which is the distance between the measurement and the closest particle, while the landmark likelihood depends on the distance between the particle landmarks and target object contours representing a measure for shape alignment. Furthermore, the semantic likelihood is defined by a dissimilarity metric given the particle's semantics.

In order to update the particle landmarks, that are defined previously according to the Rao-Blackwellisation process, 2×2 Kalman filters (one per landmark) are used. The state that is estimated by each Kalman filter is a 2D position. Moreover, each particle's mass for occupied and mass for free is updated with the associated measurement masses by using the Dempster-Shafer rule of combination.

Based on the updated particles, the grid cell states and the tracklet states are estimated. These estimations are weighted averages of the particle states. To compute the grid cell state, all tracklets projected into the same cell are used, regardless of which tracklet they belong to. Whereas, the tracklet state is estimated based on its corresponding particles, irrespective of which cell they are projected into.

Stochastic Universal Resampling algorithm with linear complexity is used to resample the particles after normalizing particle weights for each tracklet. This algorithm selects a new set of particles from the previous set by taking their importance weights into account and thus replacing particles with lower weights. Preferably, a selective resampling strategy is executed, where the particle resampling is triggered only when the particle diversity is lower than a predefined threshold.

Preferably, at an end of every grid map particle filter iteration t, a final tracklet list $H_t$ comprises a subset of persistent tracklets $H_{t,p}=\{h_{t,p}^{[i]}, w_{h,p}^{[i]}\}_{i=1}^{N_p}$ and another subset of newly initialized tracklets, also called new tracklets $H_{t,b}=\{h_{t,b}^{[i]}, w_{h,b}^{[i]}\}_{i=1}^{N_b}$.

Thus, the tracklet list is defined by:

$$H_t = H_{t,p} \cup H_{t,b} = \{h_{t,p}^{[i]}, w_{h,p}^{[i]}\}_{i=1}^{N_p} \cup \{h_{t,b}^{[i]}, w_{h,b}^{[i]}\}_{i=1}^{N_b}$$

The list of persistent tracklets $H_{t,p}$ is obtained by resampling from all the surviving tracklets propagated from time t to time t+1. The list of new tracklets $H_{h,b}$ is obtained by sampling according to a set of initialization weights $w_{init}^{[c]}$ predetermined for each measurement grid cell c.

As long as the number of tracklets does not reach maximum capacity of the memory, new tracklets are appended to the existing list of new tracklets. However, in cases when the maximum memory capacity is reached, the method ensures that, through sampling, the list of new tracklets will have a balanced ratio between new tracklets and persistent tracklets. In these extreme cases, the maximum allowed number of new tracklets is a parameter of the system and is setup to be less than 20% of the total available space in the list.

Preferably, a tracklet occupancy mass $m_h(Occ)$ is determined as weighted average of occupancy masses of its particles $m_h^{O,[i]}$, where $\hat{w}^{[i]}$ is a normalized particle weight.

$$m_h(Occ) = \Sigma_{i=1}^{N_h} \hat{w}^{[i]} \cdot m_h^{o,[i]}$$

The tracklet occupancy mass is used to determine how well a measured cell is covered by its underlying tracklets.

Preferably, a cell mass-based intensity $D_c$ of a grid cell is determined as a sum of all its tracklet occupancy masses $m_h^{[c]}(Occ)$ $$D_c = \Sigma_{i=1}^{N_{h,c}} m_h^{[c]}(Occ)$$

$N_{h,c}$ denotes a number of tracklets that fall into the grid cell c. The mass-based intensity is interpreted as the expected number of target objects in the cell. It also provides a quantitative value about how well a cell is covered by tracklets.

Preferably, the initial weights $w_{init}^{[c]}$ indicate how likely it is that new tracklets $h_t^{[i]}$ need to be initialized into a given cell c. The weights have to be proportional to the need of initializing new tracklets. Thus, the initial weight is determined as follows:

$$w_{init}^{[c]} = \begin{cases} m_c(Occ) - D_c, & m_c(Occ) > D_c \\ 0 & m_c(Occ) < D_c \end{cases}$$

$m_c(Occ)$ is the measurement occupancy mass of the cell c, and $D_c$ is the mass-based intensity.

Suppose the system memory is limited so that the maximum of tracklets that are allowed to be created is $N_{max}$. Additionally, the maximum number of newly accepted tracklets is $N_{new\_max}$. $N_{new\_max}$ is the maximum number of new tracklets used to allocate new tracklets when the memory is filled out, or in other words not many empty slots are available. That means that even if the memory is full, some of the old tracklets would be replaced by a constant number of new tracklets $N_{new\_max}$. The goal is to determine the new amount of persistent tracklets $N_{p\_updated}$ and new tracklets $N_{new}$ for the next particle filter iteration at t, given the established memory limitations.

The number of estimated tracklets $N_{eti}$, to be initialized if there would not be any memory constraints is determined by counting all the grid cells that meet the condition $m_c(Occ) > D_c$. Without memory limitation, new tracklets would be initialized in all grid cells. However, having the above defined bounds, the number of new tracklets $N_{new}$ is determined by $$N_{new} = \min(N_{eti}, \max(N_{new\_max}, N_{es}))$$

$N_{es}$ is the number of empty slots available for adding new tracklets, which is defines as:

$$N_{es} = N_{max} - N_{p,t}$$

wherein $N_{p,t}$ is the total number of tracklets used in the current particle filter iteration.

The updated number of persistent tracklets $N_{p,t+1}$ is determined by $$N_{p,t+1} = \min(N_{p,t}, N_{max} - N_{new})$$

If the number of persistent tracklets is close to the max number of allowed tracklets then it is preferred to allocate a fix number for new tracklets, like 100, and the rest number for updated persistent tracklets, like 900=1000(max)−100 (new).

If the number of persistent tracklets is much lower than the max allowed number, for example $N_{p,t}=90$ of $N_{max}=1000$, advantage of the available space can be taken. However, at the same time other parameters like $N_{eti}$, $N_{es}$ and $N_{new\_max}$ are considered. This is indicated by the following constraint:

$$N_{new} = \min(N_{eti}, \max(N_{new\_max}, N_{es}))$$

Thus, a tracking solution for tracklets is provided, which automatically adapts the number of estimated tracklets based on the available memory on a computer device. In other words, a memory complexity is bounded to a fixed capacity, which is given as a parameter.

Thus a hierarchical memory structure of particles, tracklets, objects and grid maps is provided.

In a preferred embodiment, the method comprises the following steps. Validating the tracklets dependent on a validation metric, thereby determining invalid tracklets and removing the invalid tracklets from the list of previous tracklet.

In a preferred embodiment, the validation metric comprises an age of a tracklet and/or an existence probability of a tracklet.

In a preferred embodiment, the method comprises the following steps. Sampling updated persistent tracklets comprises sampling new tracklet indices from the list of previous tracklets and sampling the new tracklets comprises sampling new measurement indices for initializing the new tracklets.

In a preferred embodiment, the method comprises the step of executing a tracklet prediction comprises determining tracklet weights of the persistent tracklets and the new tracklets.

Thus, a hierarchical propagation of the target object existence probability is provided. The existence probability of an object is given as a sum of all its tracklets' existence probabilities. While the existence probability of a tracklet is described by the sum of all the particle weights. The change of a particle weight is reflected as a change in the tracklet existence probability and thus an object existence probability.

In a preferred embodiment, the tracklet is an individual particle filter-based estimator indicating a group of particles.

In a preferred embodiment, determining the amount of new tracklets comprises determining an amount of empty slots, subtracting the amount of persistent tracklets from the memory bound and choosing the lower amount of the amount of estimated new tracklets and a higher amount of a maximum amount of new tracklets and the amount of empty slots.

In a preferred embodiment, wherein determining the amount of updated persistent tracklets comprises choosing the lower amount of the amount of persistent tracklets and a difference between the memory bound and the amount of new tracklets.

Therefore one of the imposed challenges is to design a dynamic environment estimation component that is scalable (new sensors can be added) and flexible (the estimation solution could be easily decoupled or adapted to different combination of sensors). At the same time, the environment perception should be able to cope with the cases when a part of the sensor system fails, by generating the right model with the remaining sensors. Finally, we need an estimation solution that is able to automatically "self-adapt" to the available computational resources and memory.

According to an aspect, a control unit is configured for executing a method for managing tracklets in a particle filter estimation framework, as described herein.

In a preferred embodiment, a computer program is provided, comprising instructions which, when the program is executed by a computer, cause the computer to carry out the method for measuring the boundary performance, as described herein.

In a preferred embodiment, a computer-readable data carrier is provided, having stored there on the computer program, as described herein.

According to an aspect, a method for classifying objects in image data comprises the steps receiving the image data and classifying the objects in the image data using a tracking method executed by a particle filter estimation framework, wherein the tracking method comprises the method for managing tracklets, as described herein.

In image recognition, objects in images are detected and classified. For example in the field of autonomous driving the objects are classified in classes like street, traffic participants and environment. For a plurality of subsequent images, a tracking method is used for redetecting the objects of the different images. Preferably, the tracking method is based on tracklets, which represent an individual particle filter-based estimator.

Thus, the improved method for managing tracklets results in an improved method for classifying objects in in image data.

According to an aspect, a control method of an at least partly autonomous robot, comprises the steps receiving sensor data of the at least partly autonomous robot, executing an image recognition on the received sensor data, comprising executing the method for managing tracklets in a particle filter estimation framework, as described herein and controlling the at least partly autonomous robot dependent on the executed sensor recognition.

Preferably, the sensor data relate to objects in the environment of the at least partly autonomous robot.

Preferably, the sensor data comprises lidar data, radar data, thermal data, ultrasonic data and/or image data, in particular camera data.

Preferably, the at least partly autonomous robot comprises an at least partly autonomous vehicle. Alternatively, the at least partly autonomous robot may be any other mobile robot, for example those moving by flying, swimming, diving or walking. In an example, the at least partly autonomous robot may be an at least partly autonomous lawn mower or an at least partly cleaning robot.

BRIEF DESCRIPTION OF THE DRAWINGS

The subject matter of the disclosure will be explained in more detail in the following text with reference to preferred exemplary embodiments, which are illustrated in the attached drawings, in which.

DETAILED DESCRIPTION

Figure 1:
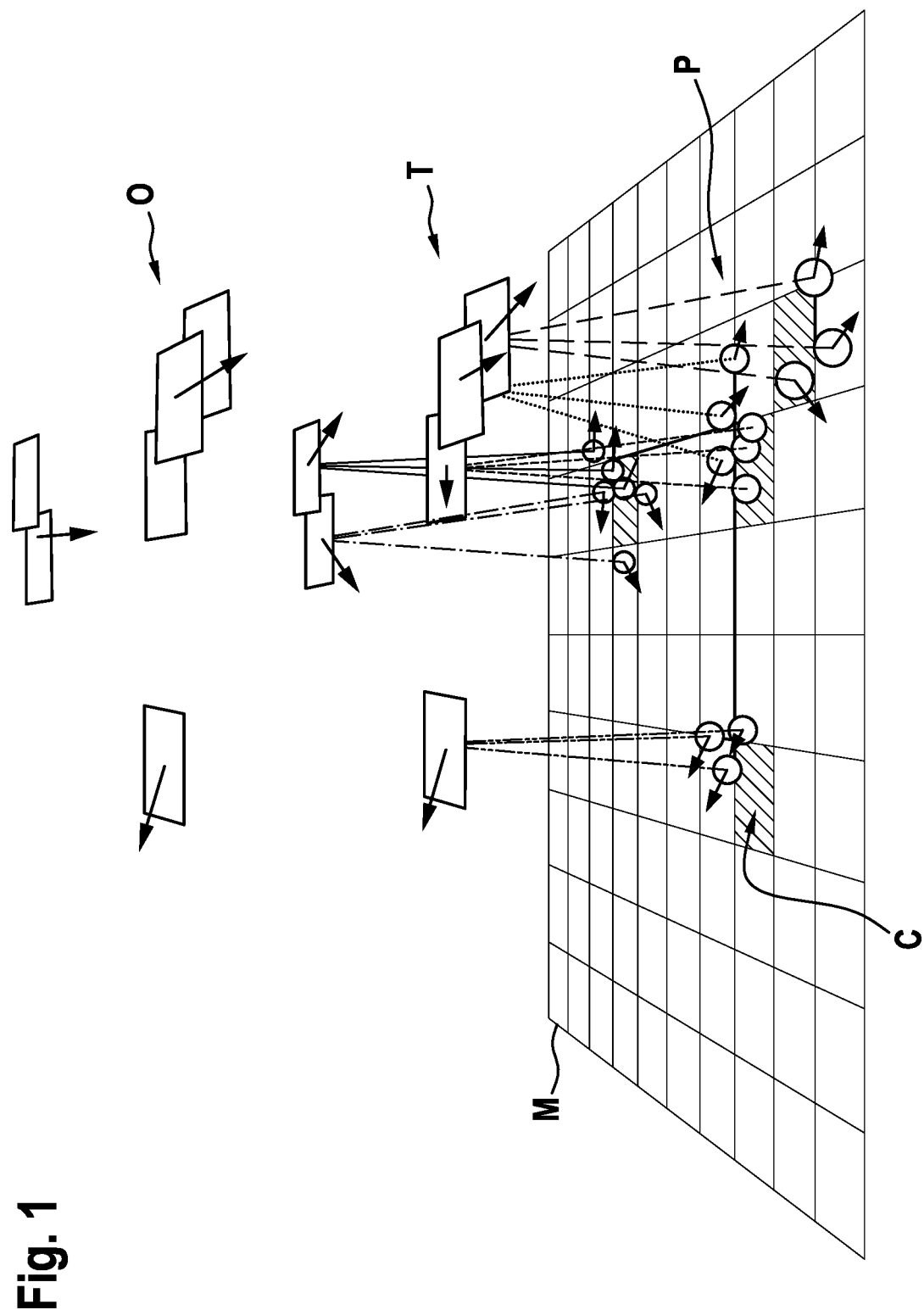
FIG. 1 shows a schematic view of a relation between objects, tracklets and particles.

The reference symbols used in the drawings, and their meanings, are listed in summary form in the list of reference symbols. In principle, identical parts are provided with the same reference symbols in the figures.

FIG. 1 shows a schematic view of a relation between objects, tracklets and particles. For example a traffic scenario is observed by different sensors resulting in a grid map M of a plurality of grid cells C. In the grid map M at least one object O is identified. Particles P are grouped into tracklets T. Every tracklet T comprises a tracklet state, which is updated with an individual particle filter by employing its own particles P. Multiple particles P are used to determine objects O by clustering the particles P.

Figure 2:
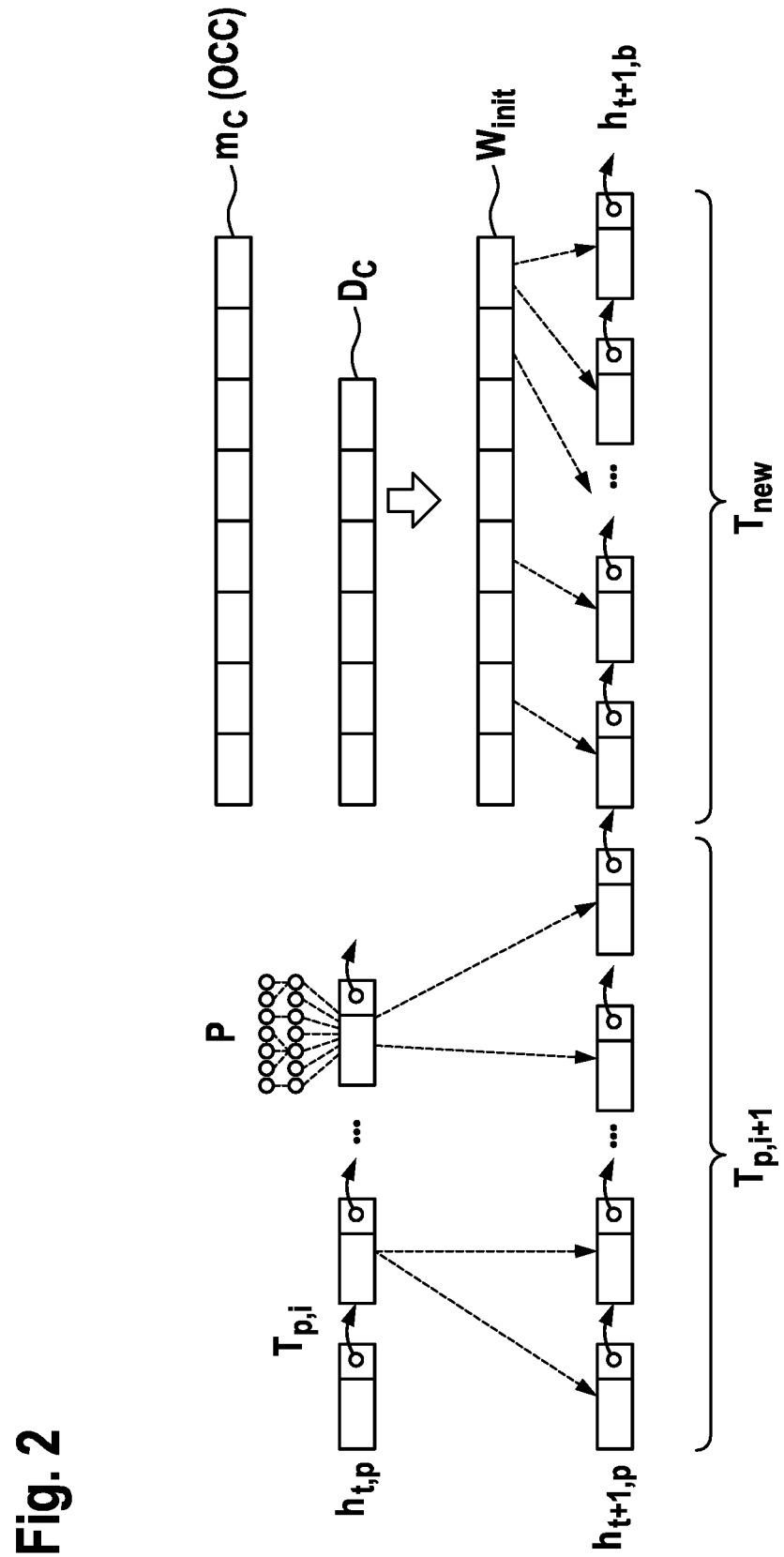
FIG. 2 shows a schematic view of a method for managing tracklets in a particle filter estimation framework.

FIG. 2 shows a schematic view of a method for managing tracklets in a particle filter estimation framework.

A plurality of persistent tracklets $T_{p,t}$ are available in a plurality of lists of previous tracklets $h_{t,p}$ at a certain time-point t. In a next time step t+1, updated a plurality of persistent tracklets $T_{p,t+1}$ are determined in a plurality of lists of updated persistent tracklets $h_{t+1,p}$. The persistent tracklets $T_{p,t+1}$ are either just resampled from a list of persistent tracklets $h_{t,p}$ or selectively resampled from particles P of persistent tracklets from a list of previous tracklets $h_{t,p}$.

Additionally, lists of new tracklets $h_{t+1,b}$ comprising a plurality of new tracklet $T_{new}$, are determined based on measurement occupancy masses $m_{c(Occ)}$, grid cell mass-based intensities $D_C$ and initialization weights $w_{init}$.

Figure 3:
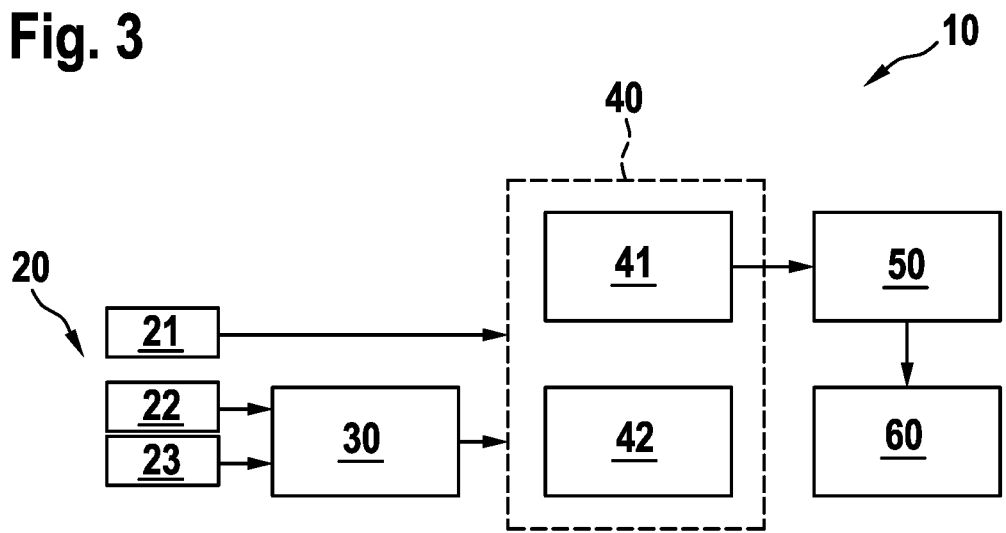
FIG. 3 shows a schematic view of the particle filter estimation framework.

FIG. 3 shows a schematic view of a particle filter estimation framework 10. The particle filter estimation framework 10 comprises a plurality of sensors 20, providing sensor data of for example a traffic scenario. In this case, a set of radar sensors 21, a stereo vision sensor 22 and a laser sensor 23 provide sensor data from an environment of a vehicle in the traffic scenario. For example, the sensor data cover a front view, a rear view, a left view and a right view of the vehicle. The sensor data from the stereo vision sensor 22 and the laser sensor 23 are provided to a semantic stixel unit 30, which provides a more compact Stixel-based representation of the sensor data.

The preprocessed sensor data is provided to grid channel 40, which comprise separate evidence grid channel, in this case an occupancy grid channel 41 and a semantic grid channel 42. The grid channels 40 fed with the sensor data is the basis for a multi-layer particle filter-based tracking, executed by an estimation unit 50. The estimation unit 50 provides estimated dynamic tracklets 60, which indicate a dynamic location of objects around the vehicle.

Figure 4:
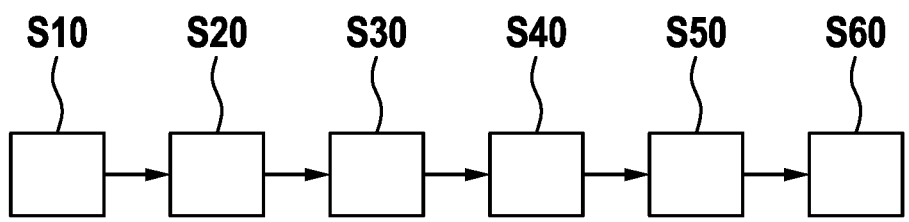
FIG. 4 shows another schematic view of a method for managing tracklets in a particle filter estimation framework.

FIG. 4 shows another schematic view of a method for managing tracklets in a particle filter estimation framework. In a first step S10 a tracklet prediction is executed dependent on a list of previous tracklets $T_{p,t}$, thereby determining persistent tracklets and new tracklets $T_{new}$. In a second step S20, new measurements for initializing the new tracklets $T_{new}$ are sampled, thereby determining an amount of estimated new tracklets $N_{eti}$. In a third step S30, an amount of persistent tracklets $N_{p,t}$ is determined dependent on the list of previous tracklets $T_{p,t}$. In a fourth step S40, an amount of new tracklets $N_{new}$ and an amount of updated persistent tracklets $N_{p,t+1}$ is determined to be sampled dependent on the amount of estimated new tracklets $N_{eti}$, the amount of persistent tracklets $N_{p,t}$ and a memory bound $N_{max}$. In a fifth step S50, updated persistent tracklets $T_{p,t+1}$ are sampled from the list of persistent tracklets $T_{p,t}$ dependent on the determined amount of updated persistent tracklets $N_{p,t+1}$. In a sixth step S60, the new tracklets $T_{new}$ are sampled from unassociated measurements dependent on the determined amount of new tracklets $N_{new}$.

What is claimed is:

1. A method for managing tracklets in a particle filter estimation framework, comprising:
   executing a tracklet prediction dependent on a list of previous tracklets, thereby determining persistent tracklets and new tracklets;
   sampling new measurements for initializing the new tracklets, thereby determining an amount of estimated new tracklets;
   determining an amount of the persistent tracklets dependent on the list of previous tracklets;
   determining an amount of the new tracklets and an amount of updated persistent tracklets to be sampled dependent on the amount of estimated new tracklets, the amount of the persistent tracklets, and a memory bound;
   sampling the updated persistent tracklets from a list of the persistent tracklets dependent on the determined amount of the updated persistent tracklets; and
   sampling the new tracklets from unassociated measurements dependent on the determined amount of the new tracklets.

2. The method of claim 1, further comprising:
   validating the persistent tracklets dependent on a validation metric, thereby determining invalid tracklets; and
   removing the invalid tracklets from the list of previous tracklets.

3. The method of claim 2, wherein the validation metric comprises an age of a tracklet and/or an existence probability of a tracklet.

4. The method of claim 1, wherein:
   sampling the updated persistent tracklets comprises sampling new tracklet indices from the list of previous tracklets; and
   sampling the new tracklets comprises sampling new measurement indices for initializing the new tracklets.

5. The method of claim 1, wherein executing a tracklet prediction comprises determining tracklet weights of the persistent tracklets and the new tracklets.

6. The method of claim 1, wherein each tracklet is an individual particle filter-based estimator indicating a group of particles.

7. The method of claim 1, wherein determining the amount of the new tracklets comprises:
   determining an amount of empty slots;
   subtracting the amount of the persistent tracklets from the memory bound; and
   choosing a lower amount of the amount of estimated new tracklets and a higher amount of a maximum amount of the new tracklets and the amount of empty slots.

8. The method of claim 1, wherein determining the amount of updated persistent tracklets comprises:
   choosing a lower amount of the amount of the persistent tracklets and a difference between the memory bound and the amount of the new tracklets.

9. The method of claim 1, wherein a control unit is configured to execute the method.

10. A method for classifying objects in image data, comprising:
    receiving the image data; and
    classifying the objects in the image data using a particle filter estimation framework for managing tracklets, the particle filter estimation framework configured to:
      execute a tracklet prediction dependent on a list of previous tracklets, thereby determining persistent tracklets and new tracklets;
      sample new measurements for initializing the new tracklets, thereby determining an amount of estimated new tracklets;
      determine an amount of the persistent tracklets dependent on the list of previous tracklets;
      determine an amount of the new tracklets and an amount of updated persistent tracklets to be sampled dependent on the amount of estimated new tracklets, the amount of the persistent tracklets, and a memory bound;
      sample the updated persistent tracklets from a list of the persistent tracklets dependent on the determined amount of the updated persistent tracklets; and
      sample the new tracklets from unassociated measurements dependent on the determined amount of the new tracklets.

11. A control method of an at least partly autonomous robot, comprising:
    receiving sensor data of the at least partly autonomous robot;
    executing a sensor recognition on the received sensor data according to a method of managing tracklets in a particle filter estimation framework comprising:
      executing a tracklet prediction dependent on a list of previous tracklets, thereby determining persistent tracklets and new tracklets;
      sampling new measurements for initializing the new tracklets, thereby determining an amount of estimated new tracklets;
      determining an amount of the persistent tracklets dependent on the list of previous tracklets;
      determining an amount of the new tracklets and an amount of updated persistent tracklets to be sampled dependent on the amount of estimated new tracklets, the amount of the persistent tracklets, and a memory bound;
      sampling the updated persistent tracklets from a list of the persistent tracklets dependent on the determined amount of the updated persistent tracklets; and
      sampling the new tracklets from unassociated measurements dependent on the determined amount of the new tracklets; and
    controlling the at least partly autonomous robot dependent on the executed sensor recognition.

* * * * *